(12) United States Patent
Berger

(10) Patent No.: US 10,906,751 B2
(45) Date of Patent: Feb. 2, 2021

(54) DEVICE FOR TRANSFERRING PRODUCTS

(71) Applicant: SIDEL ENGINEERING & CONVEYING SOLUTIONS, Reichstett (FR)

(72) Inventor: Julien Berger, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 16/474,095

(22) PCT Filed: Dec. 22, 2017

(86) PCT No.: PCT/FR2017/053841
§ 371 (c)(1),
(2) Date: Jun. 27, 2019

(87) PCT Pub. No.: WO2018/122525
PCT Pub. Date: Jul. 5, 2018

(65) Prior Publication Data
US 2020/0039759 A1 Feb. 6, 2020

(30) Foreign Application Priority Data

Dec. 28, 2016 (FR) .................................... 16 63446

(51) Int. Cl.
*B65G 47/71* (2006.01)
*B65G 47/08* (2006.01)
(Continued)

(52) U.S. Cl.
CPC ......... *B65G 47/715* (2013.01); *B65G 47/082* (2013.01); *B65G 47/5109* (2013.01); *B65G 47/74* (2013.01)

(58) Field of Classification Search
CPC .. B65G 47/715; B65G 47/082; B65G 47/084; B65G 47/086; B65G 47/088; B65G 47/5109; B65G 47/68; B65G 47/682
See application file for complete search history.

(56) References Cited

U.S. PATENT DOCUMENTS

| | | | |
|---|---|---|---|
| 5,069,594 A * | 12/1991 | Bott | B65B 69/0033 198/433 |
| 8,739,960 B2 * | 6/2014 | Eschlbeck | B65G 47/22 198/429 |

(Continued)

FOREIGN PATENT DOCUMENTS

| | | |
|---|---|---|
| FR | 2820730 A1 | 8/2002 |
| WO | 2014076390 A1 | 5/2014 |

OTHER PUBLICATIONS

International Search Report dated Apr. 4, 2018 for PCT/FR2017/053841.

*Primary Examiner* — William R Harp

(57) ABSTRACT

The present invention relates to a method for transferring products from an accumulation surface to an outlet conveyor configured to convey products in a longitudinal direction using an intermediate conveyor arranged between, and flush with, said accumulation surface and said outlet conveyor, and a pushing device the method comprises decelerating the intermediate conveyor and transferring the products between the accumulation surface and the intermediate conveyor by said pushing device and accelerating the intermediate conveyor end transferring the products from the intermediate conveyor to the outlet conveyor. The present invention also relates to a device for transferring products from an accumulation surface to an outlet conveyor, in particular one that is capable of carrying out the method according to the invention.

17 Claims, 2 Drawing Sheets

(51) Int. Cl.
*B65G 47/51* (2006.01)
*B65G 47/74* (2006.01)

(56) References Cited

U.S. PATENT DOCUMENTS

2015/0291367 A1* 10/2015 Petrovic ................. B65G 37/00
                                                    198/347.1
2019/0322465 A1* 10/2019 Berger ............... B65G 47/5109

* cited by examiner

DEVICE FOR TRANSFERRING PRODUCTS

FIELD OF INVENTION

The present invention pertains to the field of the conveying of products as part of an industrial processing line. It relates more particularly to a device for transferring products that is capable of transferring products from an accumulation surface to an outlet conveyor.

BACKGROUND OF THE INVENTION

U.S. Pat. No. 5,353,915 proposes a device that can be used to transfer products from an accumulation surface to an outlet conveyor. A plurality of conveyors activated alternately are used, subsequently converging toward a single downstream conveyor. This device is complex, takes up a great deal of space and is inflexible.

U.S. Pat. No. 6,202,827 discloses a device allowing products to be transferred from an accumulation surface to an outlet conveyor. The accumulation surface is mobile and brings the products against a fixed wall, where a pushing means transfers the products to the outlet conveyor. The products are pressed up against one another to ensure that the assembly is compact, and then the accumulation surface performs a reverse movement to remove the pressure on the row ready to be engaged on the outlet conveyor. This row is then pushed by a ram toward the outlet conveyor. In the case of round bottles, there are supplementary accessories for preventing staggering at the outlet, which adds to the complexity of this solution. This device does not, however, make it possible to prevent the formation of voids between the batches on the outlet conveyor.

SUMMARY OF THE INVENTION

An object of the present invention is to obviate these drawbacks at least in part by releasing a batch of products transversely, cyclically and on each occasion, toward an acceleration conveyor, called the "intermediate conveyor", which brings the products to the speed of the outlet conveyor.

To that end, it proposes a method for transferring products from an accumulation surface to an outlet conveyor configured to convey products in a longitudinal direction, characterized in that it is carried out by means of an intermediate conveyor arranged between, and flush with, said accumulation surface and said outlet conveyor, and a pushing means, and in that it includes the following steps:
  decelerating the intermediate conveyor and transferring the products between the accumulation surface and the intermediate conveyor by said pushing means,
  accelerating the intermediate conveyor and transferring the products from the intermediate conveyor to the outlet conveyor.

By virtue of these arrangements, products may be transferred continuously between an accumulation surface that is fixed in the conveying direction of the products and an outlet conveyor operating at a normally constant speed, with a reduced risk of products falling, the transfer steps taking place between two surfaces of which the speed relative to one another is substantially zero.

In addition, as will be further described, an advantage of the invention is that the batches are reconstituted on the outlet conveyor with a space between them that is very small relative to the size of the batch and the products themselves, and even zero.

According to further features:
  said transfer of at least a portion of the products from the intermediate conveyor to the outlet conveyor is carried out by said pushing means, allowing the method according to the invention to be carried out by simple equipment,
  said transfer of at least a portion of the products from the intermediate conveyor to the outlet conveyor may be carried out by an inclined guide arranged at the level of the intermediate conveyor such that the combination of the forward pushing exerted by the intermediate conveyor and the effect of said guide produces a transverse pushing pushing said products to the outlet conveyor, and thus the products may be transferred from the intermediate conveyor to the outlet conveyor without the need for complex transfer means,
  the at least one portion of the products transferred by said pushing means may be an upstream portion and the at least one portion of the products transferred by said guide may be a downstream portion in the conveying direction on the outlet conveyor, and a portion of the products may be transferred rapidly by the pushing means so as to free up the intermediate conveyor, and the products that are no longer engaged with the pushing wall owing to their advance on the intermediate conveyor are transferred by the guide: the batch initially present on the accumulation surface can thus be reconstituted on the outlet conveyor without spacing between the consecutive products thereof,
  the method according to the invention may further comprise the following steps:
    raising of the pushing means from the pushing height thereof until it is higher than the products,
    returning the pushing means transversely to the accumulation surface as far as a position in which it can be inserted between the next batch and the following batch,
    lowering the pushing means to the pushing height thereof,
  and the pushing means may return into position for transferring the next batch of products without disrupting the products present on the accumulation surface, and avoiding a longer cycle in a horizontal plane, and a fresh transfer cycle can begin.

The present invention also relates to a device for transferring products from an accumulation surface to an outlet conveyor configured to convey products in a longitudinal direction, comprising a pushing means, characterized in that it comprises an intermediate conveyor arranged between the accumulation surface and the outlet conveyor and adjacent and flush with the accumulation surface such as to allow a transfer of products by transverse movement of said pushing means between the accumulation surface and the intermediate conveyor, and in that the intermediate conveyor has a drive means that is separate relative to the outlet conveyor so that it is able to vary the speed of the intermediate conveyor independently of that of the outlet conveyor.

By virtue of these arrangements, products may be transferred continuously between a fixed accumulation surface and an outlet conveyor operating at constant speed with a reduced risk of products falling, the transfer steps taking place between two surfaces of which the speed relative to one another is substantially zero.

According to further features:
  said device for transferring products may comprise an inclined guide arranged at the level of the intermediate conveyor at the downstream end thereof such that the combination of the forward pushing exerted by the intermediate conveyor and the effect of said guide produces a transverse pushing pushing at least a portion of said products toward the outlet conveyor, and thus the products may be transferred from the intermediate conveyor to the outlet conveyor without the need for complex transfer means. The pushing means is simple because it is longitudinally immobile, but guarantees a compact batch recreated on the outlet conveyor, said pushing means may comprise a pushing wall and a holding wall, this simple device making it possible to add to the pushing wall a wall located downstream of the products in the direction in which they are pushed, thereby limiting the risk of products falling when they are transferred, said device for transferring products may comprise a secondary pushing means configured to push at least a portion of the products from the intermediate conveyor to the outlet conveyor, and thus while the secondary pushing means pushes the products from the intermediate conveyor to the outlet conveyor the pushing means can fetch the following batch on the accumulation surface and the method can thus be more rapid. The device thus has a pushing means for releasing the products in batches from the accumulation surface as far as onto the intermediate conveyor and another, separate means, namely a secondary pushing means, that pushes the products from the intermediate conveyor as far as onto the outlet conveyor. This contributes to shorter cycle times since the tools are able to work in parallel. Alternately, in order to have a simple mechanism, it is possible to opt to use the same pushing means for carrying out the two successive transfers, said pushing means may be configured, first, to push the products from the accumulation surface to the intermediate conveyor and, second, to push at least a portion of the products from the intermediate conveyor to the outlet conveyor, and thus a single pushing means is necessary, and the device is simpler and less costly, said pushing means may comprise a raising mechanism configured to enable it to pass over the products and thus the pushing means is able to return into position for transferring the next batch of products without disrupting the products present on the accumulation surface, while avoiding a long return cycle in a horizontal plane, and a fresh transfer cycle can begin.

BRIEF DESCRIPTION OF THE DRAWINGS

The present invention will be better understood upon reading the following detailed description.

DETAILED DESCRIPTION

Figure 1:
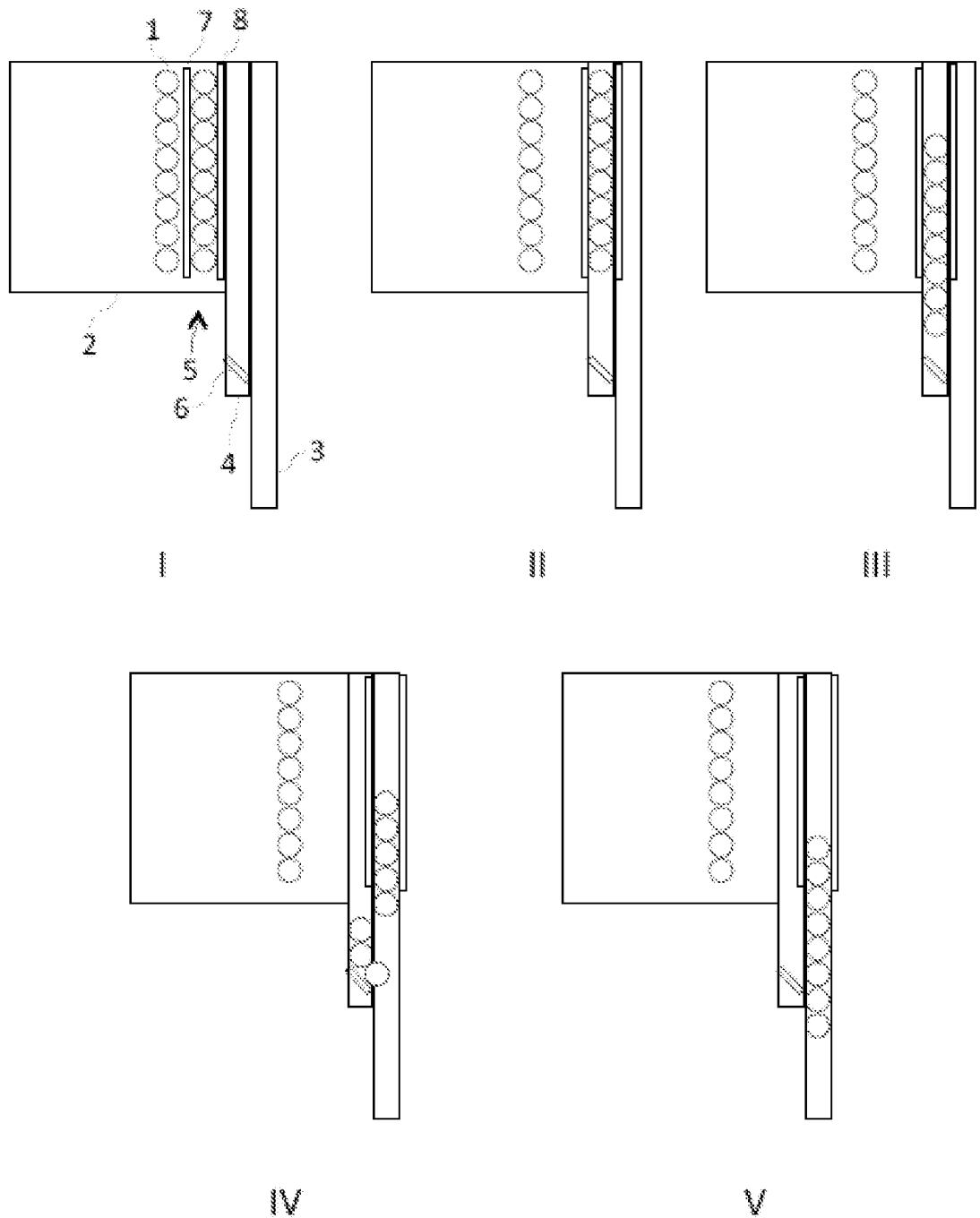
FIG. 1 is a schematic view in sequence of a method according to one embodiment of the invention.
Figure 2:
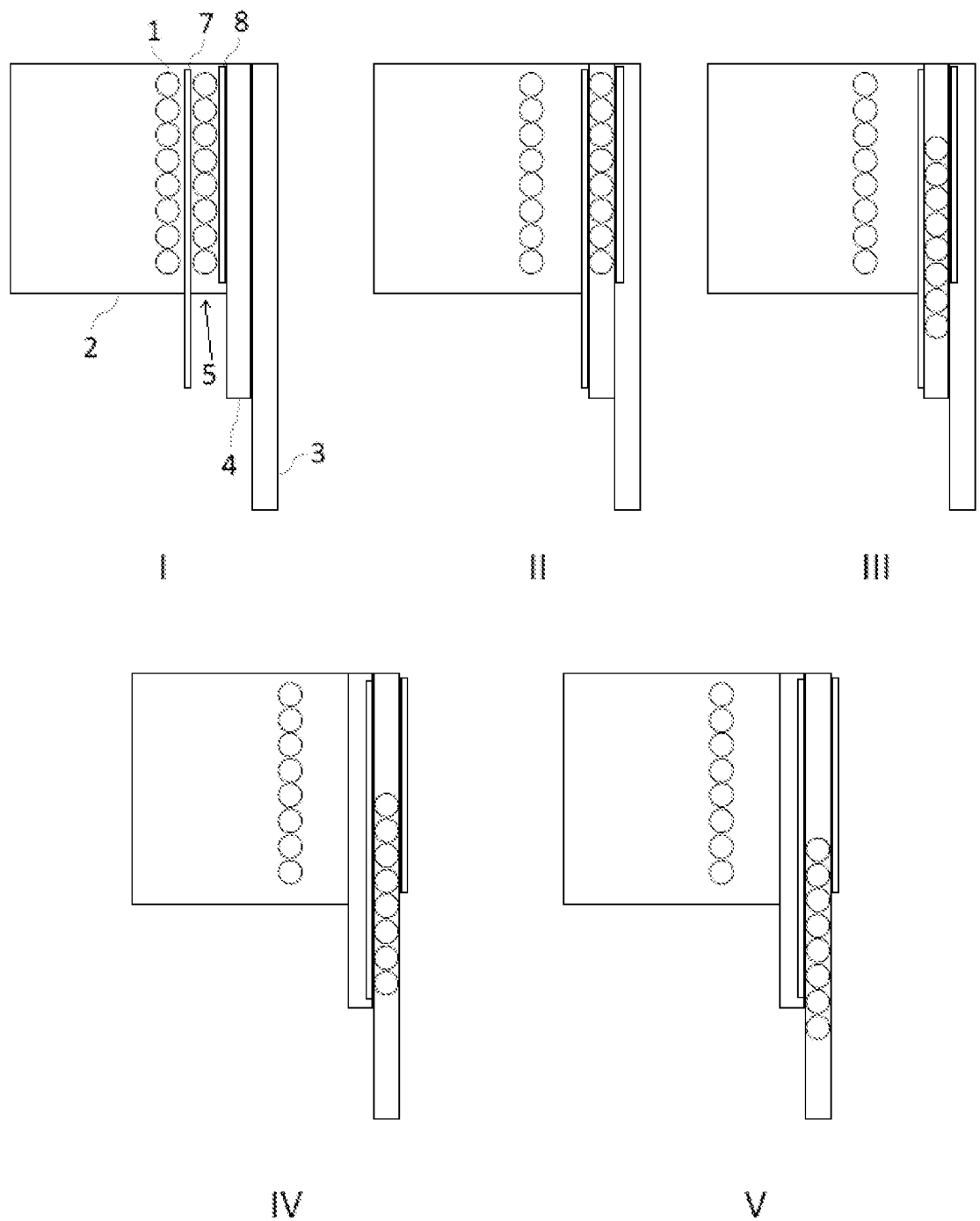
FIG. 2 is a schematic view in sequence of a method according to another embodiment of the invention.

The transfer device according to the invention shown in FIGS. 1 and 2 makes it possible to transfer products 1 from an accumulation surface 2 to an outlet conveyor 3. The products 1 may be stored on the accumulation surface 2 for a certain period of time and then transferred to the outlet conveyor 3 in accordance with the requirements of a downstream machine.

On the accumulation surface 2 the products are arranged in successive rows, i.e. in batches that each extend parallel to the outlet conveyor 3, these batches being one beside another in a direction perpendicular to that of said conveyor. Each transfer as far as onto the outlet conveyor 3 thus amounts to depositing such a batch thereon.

The outlet conveyor 3 circulates at a speed dependent on production needs and may be constant over time. This is termed a "nominal speed".

With a view to improving comprehension of the movements, the directions X, Y and Z will be qualified as follows: direction X represents the longitudinal direction of advance of the products 1 on the outlet conveyor 3; direction Y represents the horizontal direction perpendicular to X; and direction Z represents the vertical direction.

The products 1 are first transferred transversely along Y from the accumulation surface 2 to an intermediate conveyor 4 using a pushing means 5.

The pushing means 5 has a transverse action on the products, i.e. it moves them perpendicularly to the direction of advance of the outlet conveyor 3, from the accumulation surface 2.

The products 1 are transferred in batches of products 1 aligned in the longitudinal direction, namely direction X.

The accumulation surface 2 may be mobile in order to cause the products 1 to advance in a transverse direction along Y and to bring them closer to the intermediate conveyor 4. A belt of the accumulation surface 2 continuously brings a fresh batch of products 1 after the previous batch has been released. In this particular embodiment, the pushing means 5 has no need to move over the entire surface of the accumulation surface 2, and the transfer installation is thus simplified.

Thus, preferably, the accumulation surface 2 is in the form of a means driving in the direction transverse to the intermediate conveyor 4. The accumulation surface 2 itself then advances the longitudinal batches of products as far as the edge of said surface where the pushing means 5 releases them toward the intermediate conveyor 4. The pushing means 5 can then always return to the same position in order to fetch a fresh longitudinal batch, which shortens the cycle time, since the transverse movement of the batches from the side of the accumulation surface 2 opposite the intermediate conveyor 4 as far as the latter can take place during the discharge of a batch.

During the transfer of the products 1 from the accumulation surface 2 to the intermediate conveyor 4, the speed of the intermediate conveyor 4 is low or even zero. Furthermore, the intermediate conveyor 4 is placed adjacent and flush with the accumulation surface 2 such that the transfer of the products 1 along to Y from the accumulation surface 2 to the intermediate conveyor 4 is facilitated and can take place by simple sweeping by the pushing means 5. The pushing means 5 can then simply push the products 1 without a significant risk of products 1 falling. When the products 1 are all transferred to the intermediate conveyor 4, the intermediate conveyor 4 accelerates until it reaches a speed close to or equal to that of the outlet conveyor 3. For example, by means of the pushing means 5, at least a portion of the products 1 are then transferred from the intermediate conveyor 4 to the outlet conveyor 3, which may be placed flush with the intermediate conveyor 4, on the other side relative to the accumulation surface 2.

The intermediate conveyor 4 thus operates at a speed that varies between two extremes: a low speed to prevent products 1 falling during transfer from the accumulation surface 2 to the intermediate conveyor 4, and a high speed, for example close to the speed of the outlet conveyor 3, to prevent products 1 falling during transfer from the intermediate conveyor 4 to the outlet conveyor 3. Thus, during successive transfers, the relative speeds along X between the surfaces are low such that the risks of products i falling are reduced.

The intermediate conveyor 4 accelerates up to a speed corresponding essentially to that of the outlet conveyor 3. Once it has reached this speed, the products are transferred from the intermediate conveyor 4 to the outlet conveyor, preferably through the action of the pushing means 5, combined with the action of a guide 6, as described below and illustrated in FIG. 1.

With a pushing means 5 that is sufficiently long, it is thus possible to transfer a batch of products 1 of the length of the accumulation surface 2. However, during transfer of a batch of products 1 to the outlet conveyor 3, the pushing means 5 cannot be engaged on the outlet conveyor 3 until all the products 1 of the preceding batch have moved off on the outlet conveyor 3 by a sufficient distance. This will thus produce a space between the batches on the outlet conveyor 3. Such spaces may be filled by passage on a slower conveyor. Nevertheless, this reduces the flow of products 1 supplied to the downstream machine.

It is possible to make provision for the pushing means 5 to be mobile longitudinally at the speed of the outlet conveyor 3 such as to accompany all the products 1 in the batch of products 1 as far as onto the outlet conveyor 3.

According to a preferred embodiment of the invention, the transfer device further comprises a guide 6 arranged over the intermediate conveyor 4 beyond the pushing means 5, in other words beyond the extension along Y of the accumulation surface 2, and which makes it possible to guide the products 1 toward the outlet conveyor 3. As illustrated in FIG. 1, the guide 6 makes it possible to transfer, from the intermediate conveyor 4 to the outlet conveyor 3, the products 1 that are furthest downstream in a batch of products 1 that, after the intermediate conveyor 4 has been started up, are no longer engaged with the pushing means 5. Indeed, in such an embodiment, the pushing means 5 may be fixed in the direction X and have a length shorter than the length of the intermediate conveyor 4 in the longitudinal direction. The products 1 furthest downstream in the batch on the intermediate conveyor 4 are then no longer in contact with the pushing means 5 during transfer between the intermediate conveyor 4 and the outlet conveyor 3. There is thus a portion of the batch of products 1 that is transferred by the pushing means 5 and the other portion by the guide 6, the latter having been released from the pushing means 5 by the longitudinal movement of the intermediate conveyor 4 on which the products rest. When all the products 1 in the batch are transferred to the outlet conveyor 3, the batch is thus reconstituted without spacing between the products 1 in said batch, in particular owing to the fact that the products in one and the same batch are all placed on the intermediate conveyor 4 and thus advance longitudinally at the same speed, or between batches.

Thus, the guide 6 is arranged over the intermediate conveyor 4 and deflects the products onto the outlet conveyor 3. It is thus located over the intermediate conveyor 4, downstream of the portion located in line with the accumulation surface 2. It acts on the products released from the pushing means 5, the latter being immobile in the direction of advance of the intermediate conveyor 4, while the products are moved by the acceleration of the intermediate conveyor 4.

By means of adapted adjustment of the various kinematic parameters, it is possible to arrange for the products in a batch to be ultimately arranged on the outlet conveyor 3 without significant spacing relative to the products in the preceding batch, thus forming a discontinuous line, and without significant spacing between the products in one and the same batch.

The transfer device according to the invention may comprise a receiving box on the side of the outlet conveyor 3, on the side away from the intermediate conveyor 4. This outlet box can receive the products 1 in the event of a fall.

In the embodiment shown in FIG. 1, the pushing means 5 comprises a pushing wall 7 extending along the direction X and arranged such as to push the products 1 during the movement of the pushing means 5 in the direction Y. The pushing means 5 further comprises a holding wall 8 arranged on the other side of the batch of products transferred such as to prevent a fall of the products 1 at the front and also potential sliding of said products 1 in the direction Y, which would result in non-alignment of the products 1.

The pushing 7 and holding 8 walls may extend from a chassis mounted on a slide extending in the direction Y. An actuator of electric motor type makes it possible to produce the movements of the pushing means 5 in the direction Y, by means of a belt, for example.

Said slide extending in the transverse direction Y is itself fixed on a chassis mounted on a vertical slide. An actuator of electric motor type makes it possible to produce the vertical movements of the pushing means 5, by means of a belt, for example.

The pushing means 5 may in fact be caused to move vertically in order to go over the products and to fetch others: it rises in order to go over the products and then descends again. The pushing means 5 is then at least partially against the next batch or group of products that it has to push from the accumulation surface 2 as far as onto the intermediate conveyor 4. In each cycle, the pushing means 5 processes a batch constituted by a longitudinal row, i.e. extending in the direction of the outlet conveyor 3, which is the width of a single product. In each cycle, the pushing means 5 returns to just behind the next batch to be processed, which is the width of a product, but in front of the batch still over the accumulation surface 2.

It is possible, also, to imagine a multi-axis robotic solution for moving the pushing means 5.

The transfer of the products i from an accumulation surface 2 to an outlet conveyor 3 may be carried out in accordance with a method comprising the following steps:
  transferring the products 1 from the accumulation surface 2 to the intermediate conveyor 4 by the pushing means 5, the speed along X of the intermediate conveyor 4 being zero or practically zero,
  accelerating the intermediate conveyor 4, for example up to a speed close to or equal to the speed of the outlet conveyor 3, such that the risks of products 1 falling during transfer between the conveyors 3, 4 are sufficiently low,
  transferring the products i from the intermediate conveyor 4 to the outlet conveyor 3 by the pushing means 5,
  returning the pushing means 5 to its starting position, involving a lifting of said pushing means 5, in order to pass over the products 1.

These steps may then be repeated cyclically a number of times, each time transferring a batch from the accumulation surface 2 to the outlet conveyor 3.

A difference in longitudinal speed less than 0.05 m/s, or even 0.1 m/s, between the intermediate conveyor and the outlet conveyor on the one hand and relative to the accumulation surface on the other in the case of respective corresponding transfers may, in particular, be considered as sufficiently low to significantly reduce the risk of products 1 falling on account of this difference during passage from one surface to the other. It will be understood that the maximum longitudinal speed difference is dependent on the stability of the product processed.

The steps of speed change of the intermediate conveyor 4, be these accelerations or decelerations, are achieved with acceleration values that are sufficiently low to limit the risk of falls or longitudinal sliding of products 1 and sufficiently high in order that the transfer method is not excessively long and the transfer device does not take up too much space. Provision may be made in particular for a lower acceleration value owing to the fact that the intermediate conveyor 4 is laden with products 1, and a greater deceleration value owing to the fact that the intermediate conveyor 4 is empty.

The method according to the invention may thus be used to transfer products 1 from an accumulation surface 2 to an outlet conveyor 3, as illustrated in FIGS. 1 and 2. After having been stored on the accumulation surface 2 for a longer or shorter time, the products 1 are to be taken, for example, to a downstream machine.

The device according to the invention thus makes it possible to obtain a placement of the products 1 on the outlet conveyor 3 without significant spacing between two successive transferred batches or between the products that constitute a batch, by virtue of the combination of the pushing means 5 and of the guide 6.

By means of an adapted adjustment of the instant when the pushing movement starts, the acceleration thereof and the maximum speed thereof, it is possible to arrange for the space created between the portion of the batch transferred by the pushing means 5 and the preceding batch to be filled by the products 1 transferred by the guide 6.

The pushing means 5 is movable transversely along Y in order to carry out pushing. It is possible to make provision for an acceleration value of this movement, a maximum speed, and a deceleration value. Provision may be made for a deceleration value that is lower than the acceleration value in order to prevent the products 1 pursuing their travel alone in the direction Y and leading to an offset batch of products, above all if the pushing means 5 does not have a holding wall 8. Indeed, they are slowed transversely by the friction on the conveyor 3, 4 or the accumulation surface 2, and the pushing means 5 should thus preferably not slow down more greatly than the slowing produced by this friction.

During transfer, the principal risk of products 1 falling is thus due to the relative speed on X between the accumulation surface 2 and the intermediate conveyor 4, and then between the intermediate conveyor 4 and the outlet conveyor 3.

The pushing means 5, once pushing has been affected, must then return to a position that enables it to fetch the following batch of products 1 on the accumulation surface 2 and to transfer it. This position therefore depends potentially on the configuration of the accumulation surface 2 and the filling thereof. The next batch of products 1 to be transferred may be brought to the intermediate conveyor 4 in the event that the accumulation surface 2 comprises a belt movable on Y, on which the products 1 are received. The pushing means 5 must return to the initial position without colliding with the following products 1, which it will have to push transversely on Y during the next cycle. It is possible to imagine a longitudinal movement on X that is sufficiently rapid and broad to achieve this aim, by longitudinally offsetting the pushing means 5 on X until all the products 1 at least of the next batch have been passed. This is more easily achievable when the pushing means 5 consists in a simple pushing wall 7, in the absence of a holding wall 8, which would also require all the products 1 in the batch just pushed to have been passed.

More simply, provision may be made for the pushing means 5 to effect a vertical movement on Z of a value greater than the height of the products 1 in order to pass over the products 1 when it has to fetch the next batch of products 1 on the accumulation surface 2 and to insert the pushing wall between two successive batches of products 1 on the axis Y. The acceleration and deceleration values of these vertical movements will be determined as a function of the mechanical means implemented, the pushing means 5 not interacting with the products 1 during these movements.

In certain embodiments, as in particular, illustrated in FIG. 2, the pushing means 5 may be sufficiently great along the longitudinal direction X such as to transfer, by itself, a row of products 1 from the accumulation surface 2 as far as onto the outlet conveyor 3 by means of sweeps in the transverse direction Y.

Such a pushing means 5 has to be dimensioned in order to be able to transfer one and the same row of products 1:
from the accumulation surface 2 as far as onto the intermediate conveyor 4,
then, from the intermediate conveyor 4 as far as onto the outlet conveyor 3 while this row has advanced along the direction X in order that the conveyor 4 achieves a speed close to that of the outlet conveyor 3.

In other words, according to these embodiments, the pushing means 5 is longer than the transferred row. In particular
it extends at least beyond the downstream end of the row it transfers along the longitudinal direction X when it transfers this row onto the intermediate conveyor 4, and
it extends at least beyond the upstream end of the row it transfers along the longitudinal direction X when it transfers this row onto the outlet conveyor 3.

Thus, the pushing means 5 may, in particular, have a length that is slightly shorter than or even substantially equivalent to the length of the intermediate conveyor 4. Thus, it is able to act on products 1 irrespective of their positioning on this conveyor 4.

In the same manner as in the embodiments described previously, the pushing means 5, dimensioned in order to transfer the entirety of a row of products 1 from the accumulation surface 2 as far as onto the exterior conveyor 3, may comprise a pushing wall 7 and a holding wall 8, as illustrated in FIG. 2.

In this case, the two walls 7, 8 may be identical or different in length. Preferably, only the wall 7, which performs pushing, is dimensioned such as described above in order to be able to remain in engagement with the products 1 in one and the same row throughout the method, as illustrated in FIG. 2.

Indeed, the holding wall 8 does not necessarily have to extend over the entire length of the row during its transfer from the intermediate conveyor to the outlet conveyor 3, owing to the fact that the kinematics of this movement give rise to a lower risk of falling than the kinematics of the transverse movement of transfer from the accumulation surface 2 as far as onto the intermediate conveyor 4. In fact, during transfer from the conveyor 4 to the conveyor 3, the products already have a longitudinal movement imparted to them.

It is even preferable for the holding wall 8 to be substantially the same length as the rows of products 1 transferred such as to limit the risk of interference with products 1 already located on the outlet conveyor 3 during the transfer of a fresh row of products 1 onto this conveyor 3.

The embodiments as illustrated in FIG. 2 are particularly advantageous in so far as implementation is easy and the risk of falling and rotation of products during transfer steps is lessened.

Although the above description is based on particular embodiments, it in no way limits the scope of the invention and modifications may be made, in particular by substituting equivalent techniques or by a different combination of all or some of the features set forth above.

The invention claimed is:

1. A method for transferring products (1) from an accumulation surface (2) to an outlet conveyor (3) configured to convey products in a longitudinal direction using an intermediate conveyor (4) arranged between, and flush with, said accumulation surface (2) and said outlet conveyor (3), and a pushing device (5), the method comprising:
   decelerating the intermediate conveyor (4) and transferring the products (1) between the accumulation surface (2) and the intermediate conveyor (4) by said pushing device (5), and
   accelerating the intermediate conveyor (4) and transferring the products from the intermediate conveyor (4) to the outlet conveyor (3),
   wherein the transfer of at least a portion of the products from the intermediate conveyor (4) to the outlet conveyor (3) is carried out by said pushing device (5).

2. The method as claimed in claim 1, wherein said transfer of at least a portion of the products (1) from the intermediate conveyor (4) to the outlet conveyor (3) is carried out by an inclined guide (6) arranged at the level of the intermediate conveyor (4) such that the combination of the forward pushing exerted by the intermediate conveyor (4) and the effect of said inclined guide (6) produces a transverse pushing of said products (1) to the outlet conveyor (3).

3. The method as claimed in claim 2, wherein the at least one portion of the products transferred by said pushing device (5) is an upstream portion and the at least one portion of the products transferred by said inclined guide (6) is a downstream portion in the conveying direction on the outlet conveyor (3).

4. The method as claimed in claim 3, further comprising:
   moving the pushing device (5) from the pushing height thereof until the pushing device (5) is higher than the products (1),
   returning the pushing device (5) transversely to the accumulation surface as far as a position in which the pushing device (5) can be inserted between the next batch and the following batch, and
   returning the pushing device (5) to the pushing height thereof.

5. The method as claimed in claim 2, further comprising:
   moving the pushing device (5) from the pushing height thereof until the pushing device (5) is higher than the products (1),
   returning the pushing device (5) transversely to the accumulation surface as far as a position in which the pushing device (5) can be inserted between the next batch and the following batch, and
   returning the pushing device (5) to the pushing height thereof.

6. The method as claimed in claim 1, further comprising:
   moving the pushing device (5) from the pushing height thereof until the pushing device (5) is higher than the products (1),
   returning the pushing device (5) transversely to the accumulation surface as far as a position in which the pushing device (5) can be inserted between the next batch and the following batch, and
   returning the pushing device (5) to the pushing height thereof.

7. A device for transferring products (1) comprising:
   an accumulation surface (2) for accumulating products (1),
   an outlet conveyor (3) configured to convey products in a longitudinal direction,
   a pushing device (5), and
   an intermediate conveyor (4) arranged between the accumulation surface (2) and the outlet conveyor (3) and adjacent and flush with the accumulation surface (2) such as to allow a transfer of products (1) by transverse movement of said pushing device (5) between the accumulation surface (2) and the intermediate conveyor (4),
   wherein the intermediate conveyor (4) has a drive means that is separate relative to the outlet conveyor (3) so that the driving means is able to vary the speed of the intermediate conveyor (4) independently of that of the outlet conveyor (3), and
   wherein at least a portion of the transfer of the products (1) from the intermediate conveyor (4) to the outlet conveyor (3) is carried out by said pushing device (5).

8. The device as claimed in claim 7, comprising an inclined guide (6) arranged at the level of the intermediate conveyor (4) at the downstream end thereof such that the combination of the forward pushing exerted by the intermediate conveyor (4) and the effect of said guide (6) produces a transverse pushing of at least a portion of said products (1) toward the outlet conveyor (3).

9. The device for transferring products (1) as claimed in claim 8, wherein said pushing device (5) comprises a pushing wall (7) and a holding wall (8).

10. The device for transferring products (1) as claimed in claim 8, wherein said pushing device (5) is configured, first, to push the products from the accumulation surface (2) to the intermediate conveyor (4) and then push at least a portion of the products from the intermediate conveyor (4) to the outlet conveyor (3).

11. The device for transferring products (1) as claimed in claim 8, wherein said pushing device (5) is configured to enable the pushing device to pass over the products (1).

12. The device for transferring products (1) as claimed in claim 7, wherein said pushing device (5) comprises a pushing wall (7) and a holding wall (8).

13. The device for transferring products (1) as claimed in claim 12, wherein said pushing device (5) is configured, first, to push the products from the accumulation surface (2) to the intermediate conveyor (4) and then push at least a portion of the products from the intermediate conveyor (4) to the outlet conveyor (3).

14. The device for transferring products (1) as claimed in claim 12, wherein said pushing device (5) is configured to enable the pushing device to pass over the products (1).

15. The device for transferring products (1) as claimed in claim 7, wherein said pushing device (5) is configured, first, to push the products from the accumulation surface (2) to the intermediate conveyor (4) and then push at least a portion of the products from the intermediate conveyor (4) to the outlet conveyor (3).

16. The device for transferring products (1) as claimed in claim 15, wherein said pushing device (5) is configured to enable the pushing device to pass over the products (1).

17. The device for transferring products (1) as claimed in claim 7, wherein said pushing device (5) is configured to enable the pushing device to pass over the products (1).

\* \* \* \* \*